Nov. 7, 1950 J. W. PETERSON 2,528,908
TRANSPORTATION TRUCK
Filed Aug. 27, 1948 2 Sheets-Sheet 1

J. W. Peterson
INVENTOR
BY C. A. Snow & Co.
ATTORNEYS.

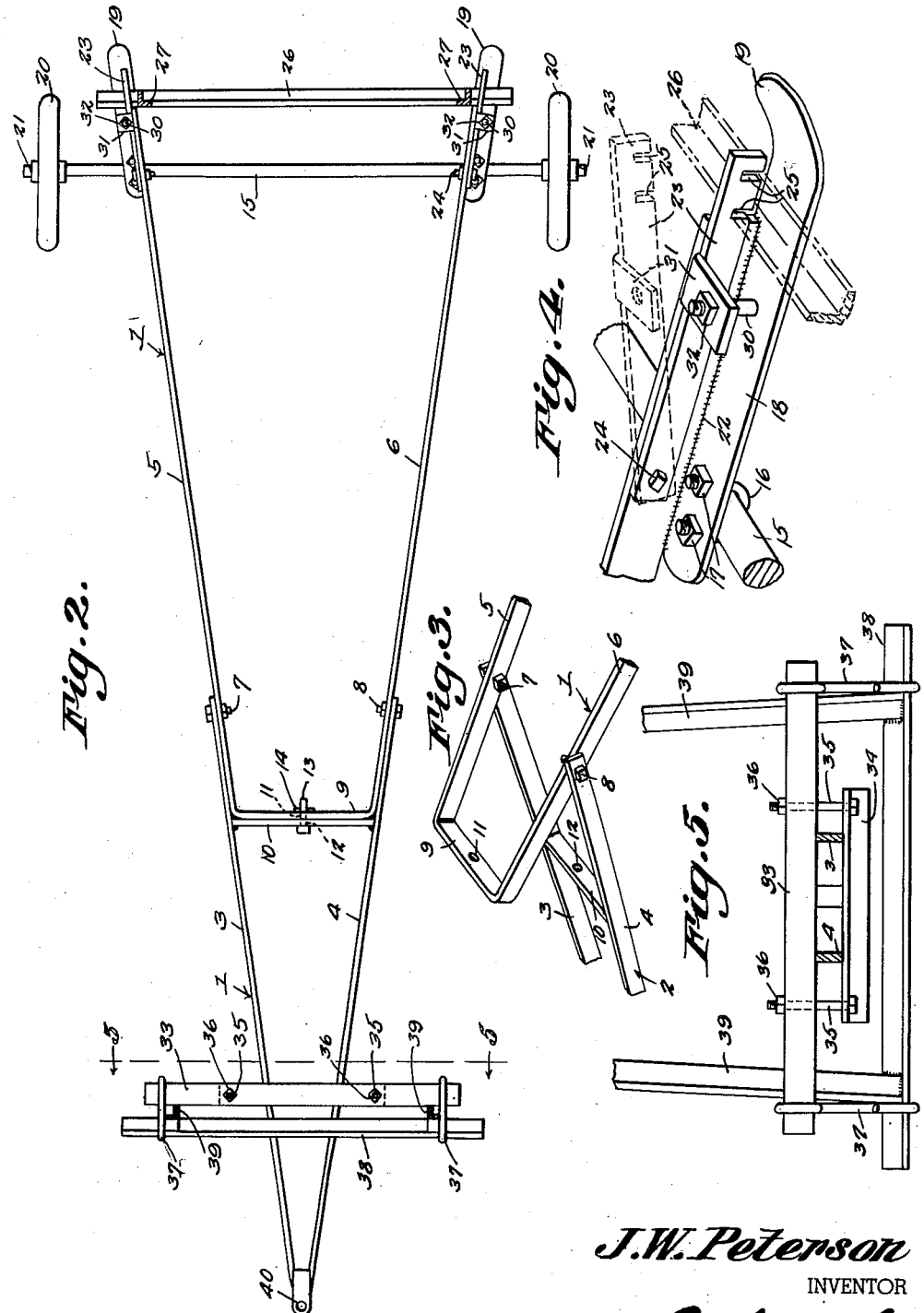

Patented Nov. 7, 1950

2,528,908

UNITED STATES PATENT OFFICE 2,528,908

TRANSPORTATION TRUCK

John Walfred Peterson, Canton, S. Dak.

Application August 27, 1948, Serial No. 46,473

3 Claims. (Cl. 214—65)

This invention relates to improvements in transportation trucks.

An object of the invention is to provide an improved transportation truck especially adapted for supporting and moving an elevator wagon hoist from place to place.

Another object of the invention is to provide a two-part wheel supported transportation truck for lifting an elevator wagon hoist upon the truck and securing the same thereon while towing behind any farm truck or tractor.

A further object of the invention is to provide an improved two-part lockable frame for a wheel supported transportation truck for readily loading an elevator wagon hoist upon the frame, and positive locking means at the opposite ends of said frame for securing the elevator wagon hoist while being moved from place to place.

A still further object of the invention is to provide an improved form and construction of transportation truck for an elevator wagon hoist which will be highly efficient in operation and relatively inexpensive to manufacture and produce.

Other objects will appear as the description proceeds.

In the accompanying drawings which form a part of this application:

Fig. 2 is a top plan view of the improved two-part pivotally connected truck frame with supporting wheels at one end thereof.

Fig. 3 is a detail perspective view of the adjacent pivoted portions of the two-part truck frame shown in open or sprung position.

Fig. 4 is an enlarged detail perspective view of a portion of the rear axle of the transportation truck with one of the pivoted locking bars for securing an elevator wagon hoist upon the truck.

Fig. 5 is a sectional view taken on the line 5—5 of Fig. 2.

Like characters of reference are used throughout the following specification and the accompanying drawings to designate corresponding parts.

Figure 1:
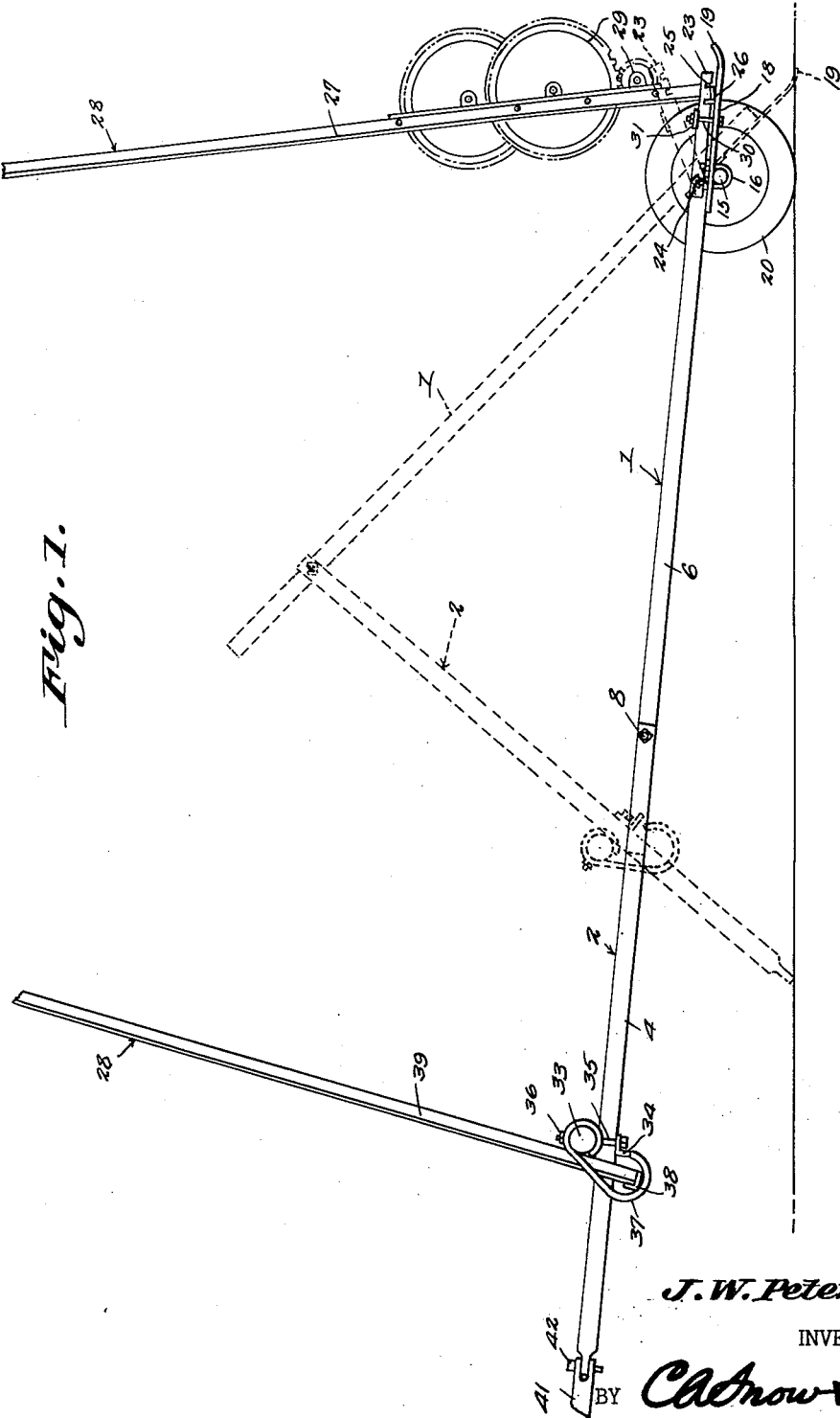
Figure 1 is a side elevation of the transportation truck with an elevator wagon hoist secured thereon, and showing in dotted lines the two-part pivotally connected truck frame in angled position.

In carrying out the invention there is shown and provided an improved form and construction of wheel supported transportation truck especially adapted for supporting and moving an elevator wagon hoist including a two-part truck frame formed by a U-shape rear portion 1 and an A-shape front section 2.

The inner ends of the legs 3 and 4 of the A-shaped portion 2 are adapted to extend on the outside of the side legs 5 and 6 of the U-shape portion 1, being pivoted together by means of the bolts 7 and 8 which extend through the legs 3 and 5, and 4 and 6.

When the two portions 1 and 2 of the frame are in a common plane, the base 9 of the U-shape portion 1 and the connecting bar 10 of the A-shape portion 2 extend parallel and in contact with each other. The base 9 and bar 10 are apertured at 11 and 12 to receive a locking bolt 13 and locking key 14 for holding the frame in rigid position.

A transversely extending rear axle 15 is secured adjacent the rear ends of the side legs 5 and 6 of the rear portion 1 of the frame by means of the U-bolts 16 and nuts 17, said bolts 16 extending about the axle 15 and through the front ends of the shoe plates 18 which are bent up slightly at their rear ends as at 19. Supporting wheels 20 will be secured on the opposite ends of the rear axle 15 by means of the end cap nuts 21.

The rear ends of the side legs 5 and 6 of the rear portion 1 of the frame will be welded at 22 to the inner edges of the shoe plates 18 as clearly shown in Fig. 4, the legs 5 and 6 extending in a vertical plane and the shoe plates 18 extending in a horizontal plane.

Latch bars 23 will be pivotally attached at their forward ends to the side legs 5 and 6 by means of the pivot bolts 24 and will extend rearwardly a short distance beyond the rear ends of said legs 5 and 6.

Spaced upwardly extending notches 25 will be formed in the rear ends of said latch bars 23 for engaging and locking over the angle iron cross member 26 of the spaced vertical legs 27 of an elevator wagon hoist generally designated by the reference numeral 28. The hoist gearing is supported by the legs 27 and is generally designated by the reference numeral 29.

When the wagon hoist 27 is in position with the cross member 26 resting upon the shoe plates 18 and the latch bars 23 forced downwardly until their notches 25 are overlying the cross members 26, securing bolts 30 will be placed upwardly through apertures (not shown) in the shoe plates 18 and through apertures (not shown) in laterally extending lugs 31 welded to the latch bars 23, and nuts 32 threaded on said bolts 30, thus locking and holding the wagon hoist 27 upon the truck frame 1.

A transversely extending front axle member 33 will be secured upon the legs 3 and 4 of the front A-shape portion 2 of the truck frame by means of a transversely extending angle iron member 34 disposed below said legs 3 and 4 and upwardly extending bolts 35 passing through said member 34 and through the axle member 33, being secured by the nuts 36.

Depending supporting hooks 37 will be rotatably supported upon the opposite ends of the axle member 33 for engaging and supporting the transverse cross member 38 fixed between the vertical legs 39 of the other end of the wagon hoist 28, thereby securing the hoist 28 in rigid position at its opposite ends upon the truck.

An eye 40 will be formed through the front end of the A-shape portion 2 of the frame for engagement with a clevis 41 and locking bolt or pin 42 on a tractor, farm truck or automobile (not shown).

In operation, the locking pin 13 will be removed and the portions 1 and 2 of the truck frame swung upwardly and the shoe plates 18 with their curved rear ends 19 pushed underneath the foot of hoist, after which the frame is pushed downwardly until its portions are aligned, and the locking pin 13 replaced. The opposite end of the frame will be engaged by the hooks 37 while the end supported by the shoe plates 18 will be locked to secure the notched latch bars 23.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A transportation truck including a two-part frame comprising an A-shape front portion and a U-shape rear portion pivoted thereto, means for locking said portions together in alignment, a rear axle secured transversely to the rear frame portion, supporting wheels on the ends of said axle, load carrying shoe plates on the rear ends of said rear frame portion, notched latch bars pivotally attached to said rear frame portion overlying said shoe plates, pivoted means on said front frame portion for engaging a load when supported thereon, locking means for securing said latch bars in locked contact with a load, and the means for securing the load to the front frame portion comprising a transverse front axle, and load engaging hooks pivotally supported on said front axle.

2. A transportation truck including a two-part frame comprising an A-shape front portion and a U-shape rear portion pivoted thereto, means for locking said portions together in alignment, a rear axle secured transversely to the rear frame portion, supporting wheels on the ends of said axle, load carrying shoe plates on the rear ends of said rear frame portion, notched latch bars pivotally attached to said rear frame portion overlying said shoe plates, pivoted means on said front frame portion for engaging a load when supported thereon, locking means for securing said latch bars in locked contact with a load, and the rear ends of said shoe plates being curved upwardly for wedging under a load when placing the same upon the truck.

3. A transportation truck including a two-part frame comprising an A-shape front portion and a U-shape rear portion pivoted thereto, means for locking said portions together in alignment, a rear axle secured transversely to the rear frame portion, supporting wheels on the ends of said axle, load carrying shoe plates on the rear ends of said rear frame portion, notched latch bars pivotally attached to said rear frame portion overlying said shoe plates, pivoted means on said front frame portion for engaging a load when supported thereon, locking means for securing said latch bars in locked contact with a load, the rear ends of said shoe plates being curved upwardly for wedging under a load when placing the same upon the truck, and coupling means at the forward end of said A-shape front frame portion for connection with means for hauling the truck.

JOHN WALFRED PETERSON.

REFERENCES CITED

The following references are of record in the file of this patent:

UNITED STATES PATENTS

| Number | Name | Date |
| --- | --- | --- |
| 1,657,674 | Holmes | Jan. 31, 1928 |
| 1,678,395 | Kellems | July 24, 1928 |
| 2,191,181 | Rogers | Feb. 20, 1940 |
| 2,327,461 | Rowe | Aug. 24, 1943 |